(12) United States Patent
Kurosawa

(10) Patent No.: US 7,082,916 B2
(45) Date of Patent: Aug. 1, 2006

(54) VALVE SPRING SUPPORT STRUCTURE OF ENGINE

(75) Inventor: Shinichi Kurosawa, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/513,878

(22) PCT Filed: May 8, 2003

(86) PCT No.: PCT/JP03/05801

§ 371 (c)(1),
(2), (4) Date: Nov. 9, 2004

(87) PCT Pub. No.: WO03/095804

PCT Pub. Date: Nov. 20, 2003

(65) Prior Publication Data

US 2005/0172925 A1    Aug. 11, 2005

(30) Foreign Application Priority Data

May 10, 2002   (JP)   .............................. 2002-135762
Jan. 17, 2003   (JP)   .............................. 2003-009479

(51) Int. Cl.
*F02N 3/00* (2006.01)

(52) U.S. Cl. .................................................. 123/188.17

(58) Field of Classification Search ............ 123/188.17
See application file for complete search history.

(56) References Cited

FOREIGN PATENT DOCUMENTS

| JP | 56093638 | * | 6/1981 |
|----|----------|---|--------|
| JP | 2000179344 A | * | 6/2000 |

* cited by examiner

Primary Examiner—Noah P. Kamen
(74) Attorney, Agent, or Firm—Ernest A. Beutler

(57) ABSTRACT

A spring seat is formed of an outer spring seat 10k and an inner spring seat 10j formed in a stepped-down shape so as to be positioned lower than the outer spring seat 10k, and a valve spring is formed of an outer spring 37 and an inner spring 36 that is disposed coaxially inside the outer spring 37 and that is larger in spring length than the outer spring 37.

4 Claims, 7 Drawing Sheets

VALVE SPRING SUPPORT STRUCTURE OF ENGINE

TECHNICAL FIELD

The present invention relates to a valve spring support structure of an engine in which valve springs disposed between spring seats of a cylinder head and spring retainers bias, in a closing direction, opening/closing valves for opening/closing intake and exhaust valve openings.

BACKGROUND ART

A 4-cycle engine generally has a valve system in which valve springs disposed between spring seats of a cylinder head and spring retainers bias, in a closing direction, intake and exhaust valves for opening/closing intake and exhaust valve openings that communicate with a combustion chamber, and in which camshafts drive the intake and exhaust valves to open/close.

Further, in some engine capable of rotating at high speed, the aforesaid valve spring has a double structure consisting of an inner spring and an outer spring disposed coaxially outside the inner spring. In arranging such inner and outer springs, spring constant and spring length thereof are determined depending on a set load, the maximum load at the time of lifting, and so on.

Incidentally, since a height dimension of the cylinder head in a cylinder axial direction is influenced by the spring length of the valve spring, the spring length is preferably made as short as possible.

However, since the spring length of the valve spring is determined depending on the set load, the maximum load at the time of lifting, and so on, there naturally is a limit in shortening the spring length. In the aforesaid double structure consisting of the inner and outer springs, since a spring seat of the outer spring is large in outer diameter, the spring seat needs to be disposed on an upper side in order to secure a necessary wall thickness of, especially, an intake port, and therefore, there is a concern that the height dimension of the cylinder head accordingly increases.

The present invention was devised in view of the conventional circumstances described above, and it is an object of the present invention to provide a valve spring support structure of an engine capable of reducing the height dimension of a cylinder head yet securing a necessary spring length of a valve spring.

SUMMARY OF THE INVENTION

This invention is adapted to be embodied in a cylinder head of an internal combustion engine defining at least one valve supporting opening reciprocally supports a valve stem of flow controlling valve. A valve spring arrangement comprised coaxially disposed inner and outer coil spring is provided for biasing the flow controlling valve in a closing direction. The valve spring arrangement is disposed between a spring seat of the cylinder head and a spring retainer fitted to an end portion of the valve stem. The spring seat is comprised of an outer spring seat and an inner spring seat of different heights relative to the valve supporting opening. The inner spring has a greater length than the outer spring.

An invention of claim 2 is characterized in that, in claim 1, a fuel injector for injecting a fuel into a combustion chamber of the cylinder head is disposed substantially vertically below an intake port communicating with the combustion chamber, and the intake port is formed to rise toward a cylinder axis side so that an axis of the intake port and a joint surface of a cylinder head and a cylinder block make an angel large enough for an arrangement space of the fuel injector not to bulge inwardly to an inner surface thereof.

BEST MODE FOR CARRYING OUT THE INVENTION

Hereinafter, an embodiment of the present invention will be described based on the attached drawings.

Figure 1:
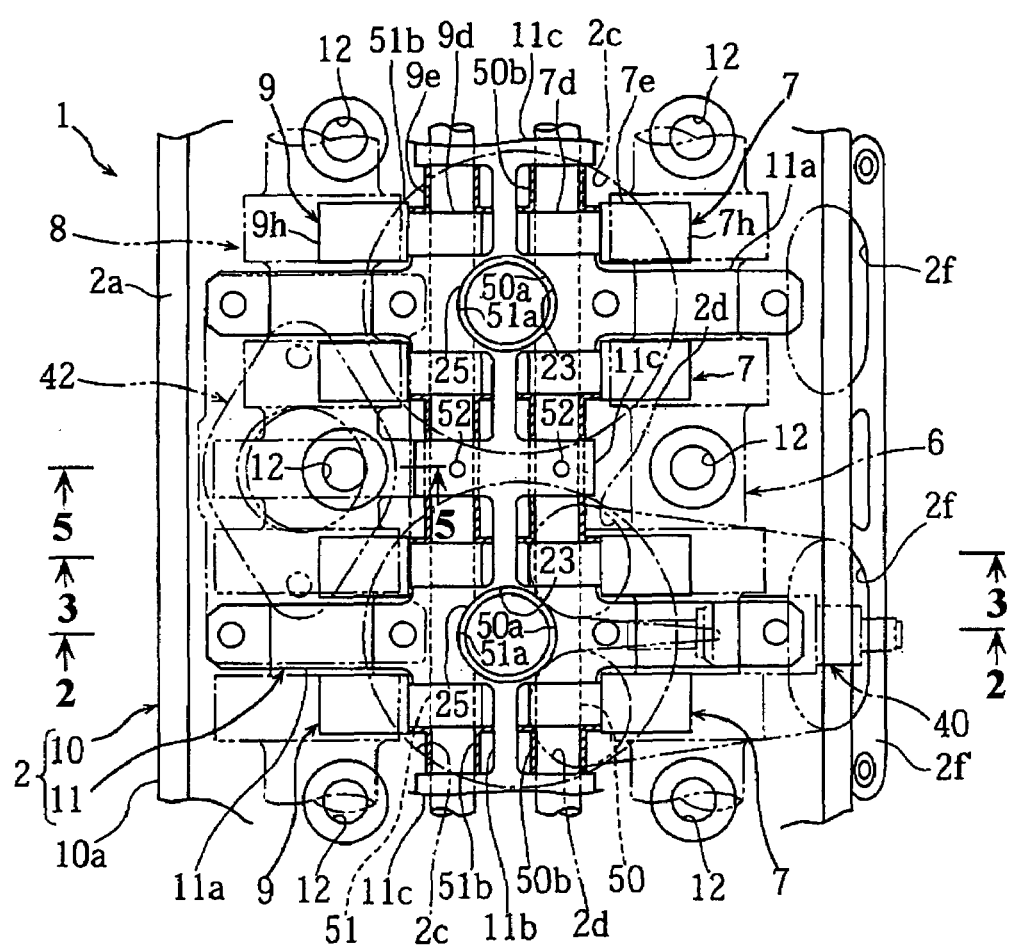
FIG. 1 is a plane view of a cylinder head of an engine according to an embodiment of the present invention.
Figure 2:
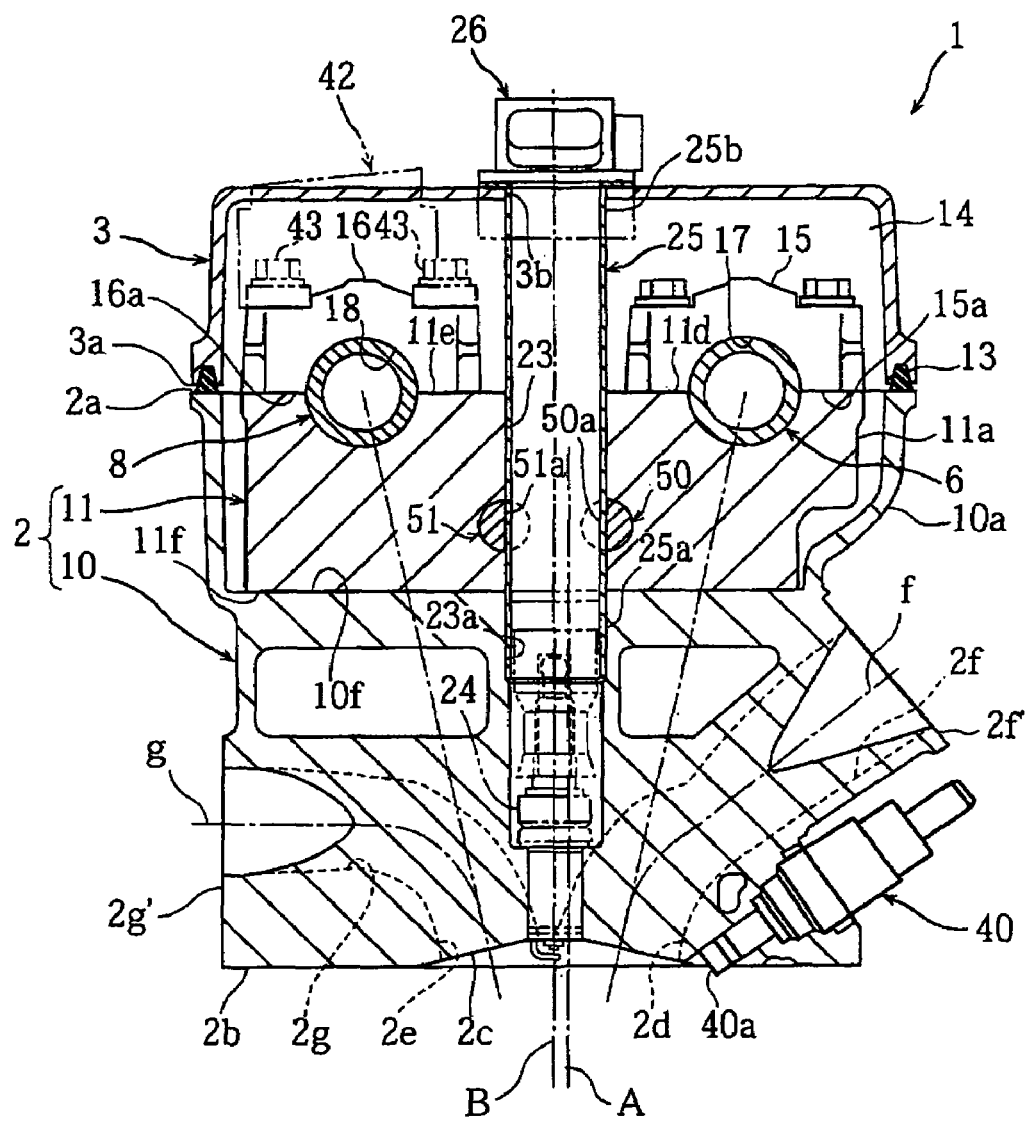
FIG. 2 is a cross-sectional view (a cross-sectional view taken along the II—II line in FIG. 1) of the cylinder head.
Figure 3:
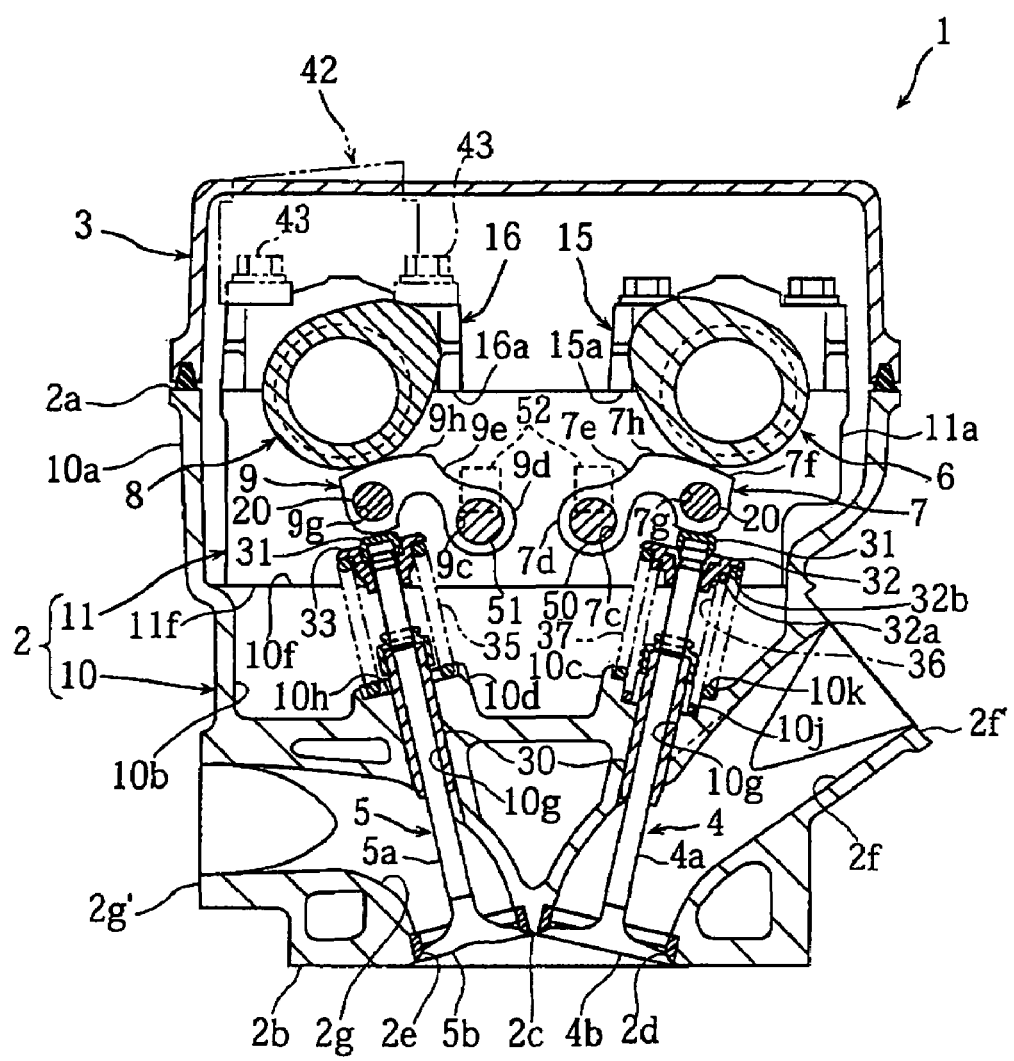
FIG. 3 is a cross-sectional view (a cross-sectional view taken along the III—III line in FIG. 1) of the cylinder head.
Figure 4:
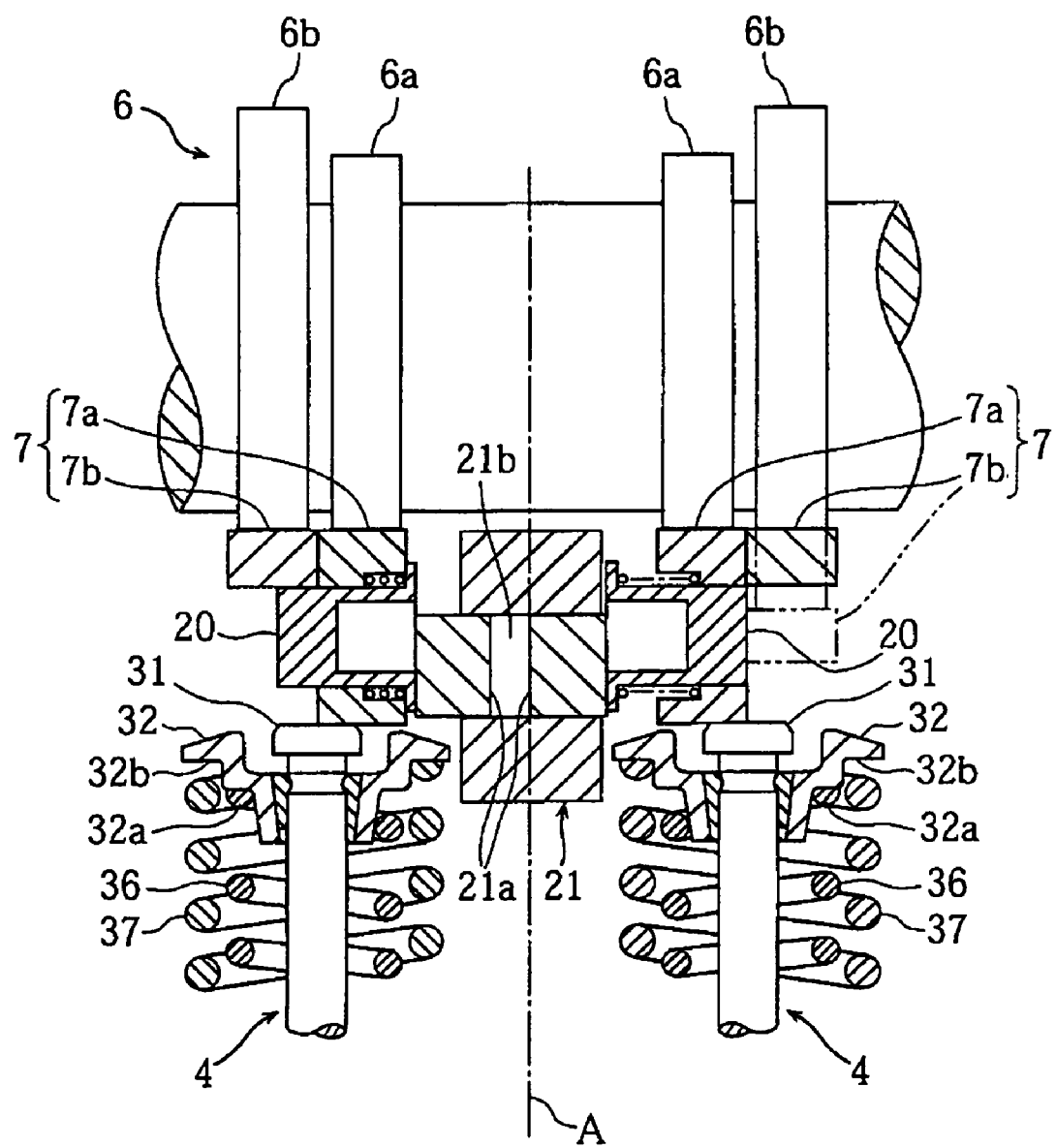
FIG. 4 is a cross-sectional view showing an operation of a varable valve lift mechanism of the engine.
Figure 5:
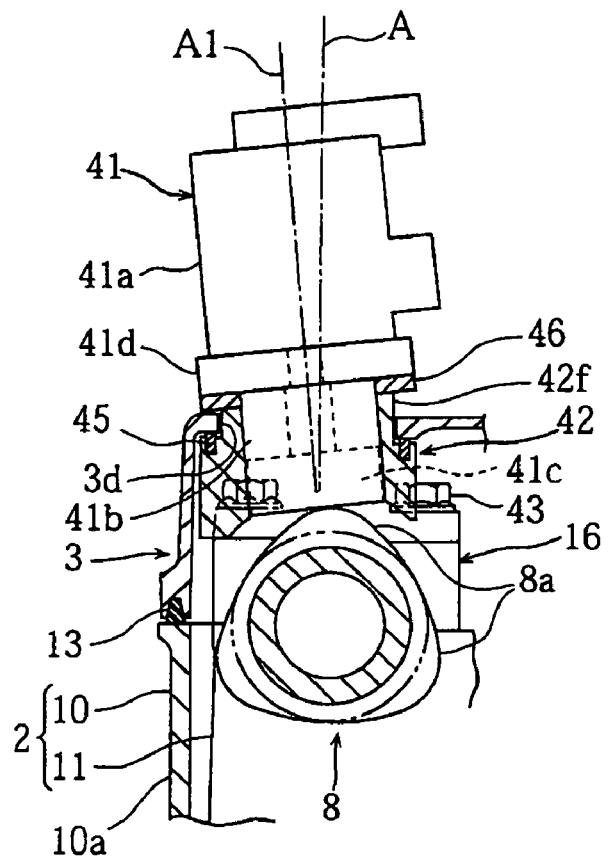
FIG. 5 is a cross-sectional view (a cross-sectional view taken along the V—V line in FIG. 1) of a portion where a fuel pump of the engine is mounted.
Figure 6:
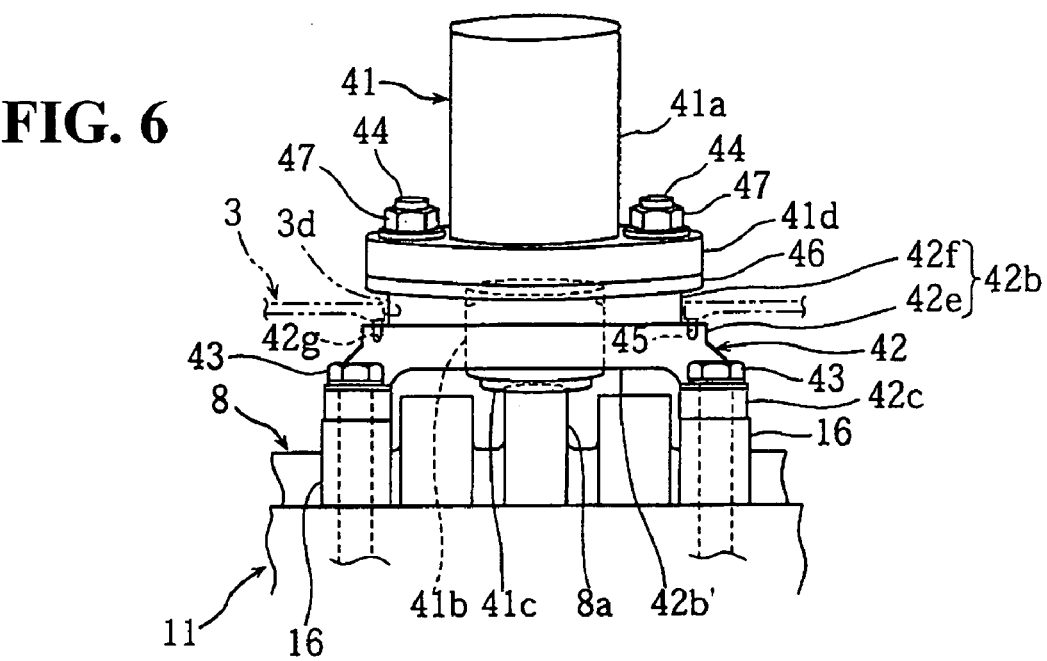
FIG. 6 is a side view of the portion where the fuel pump is mounted.
Figure 7:
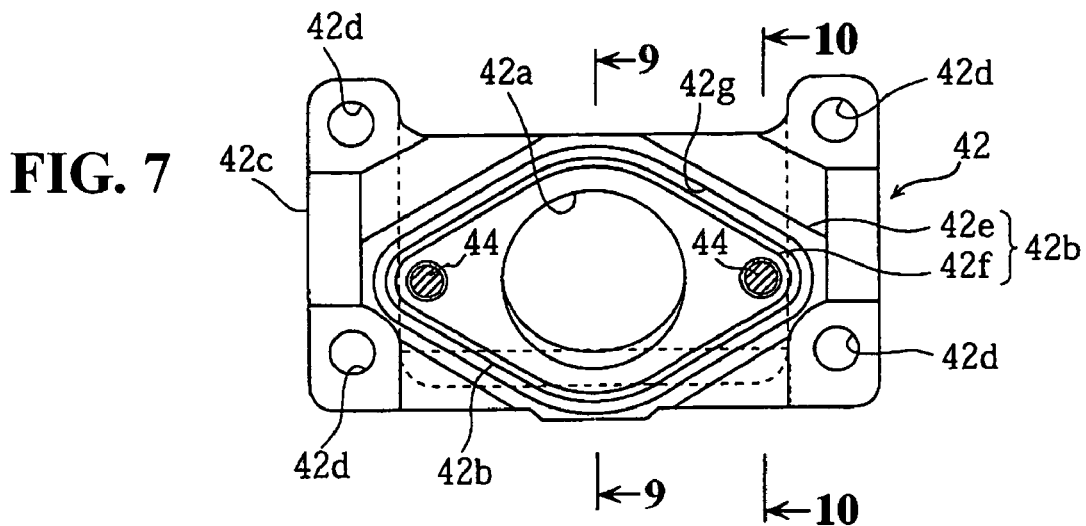
FIG. 7 is a plane view of a bracket for mounting the fuel pump.
Figure 8:
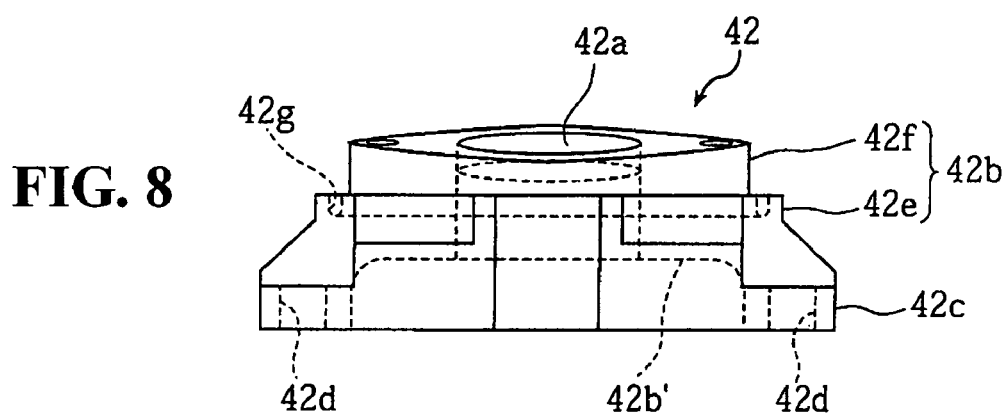
FIG. 8 is a side view of the bracket.
Figure 9:
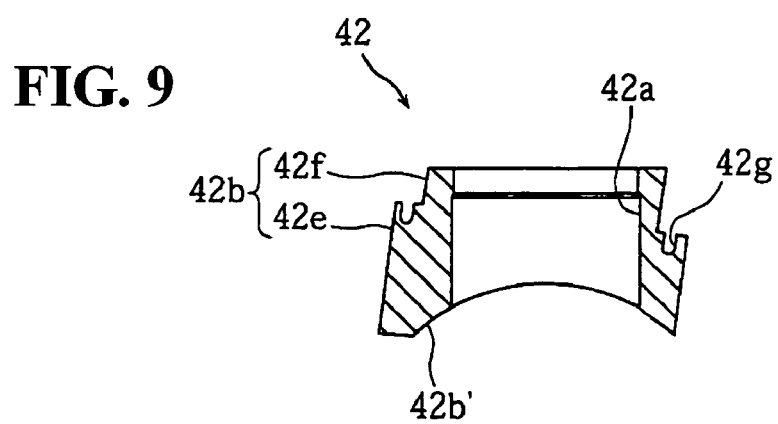
FIG. 9 is a cross-sectional view (a cross-sectional view taken along the IX—IX line in FIG. 7) of the bracket.
Figure 10:
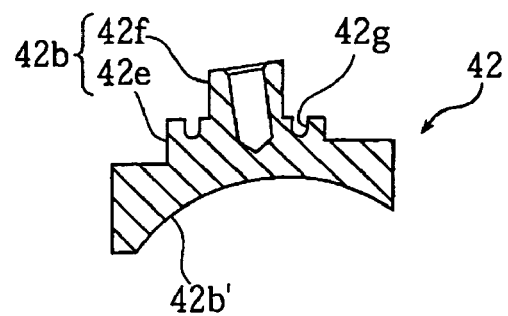
FIG. 10 is a cross-sectional view (a cross-sectional view taken along the X—X line) of the bracket.
Figure 11:
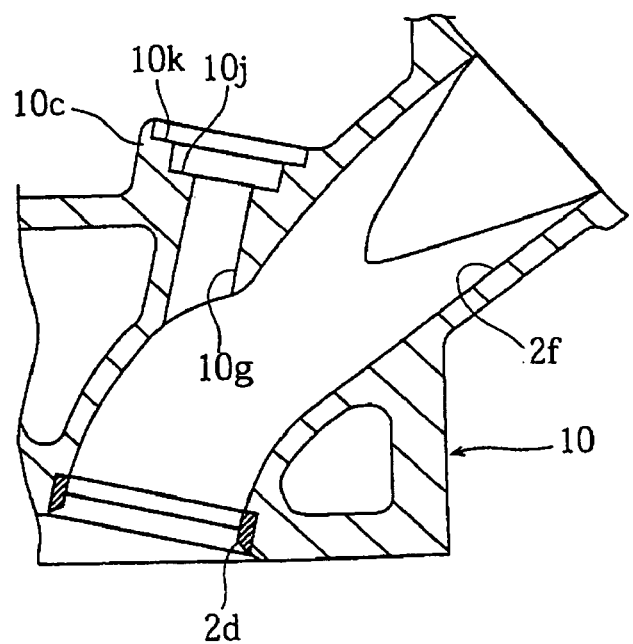
FIG. 11 is a cross-sectional view of a valve spring support portion of the cylinder head.
Figure 12:
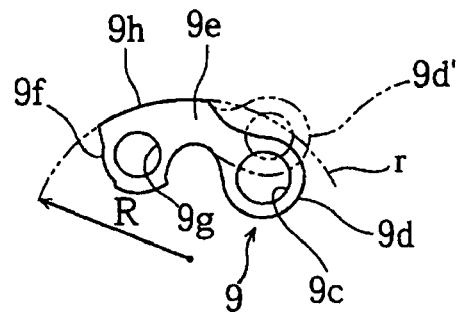
FIG. 12 is a view of a rocker arm of the engine.

FIG. 1 to FIG. 12 are views to explain a valve spring support structure of an engine according to one embodiment of the present invention: FIG. 1 is a plane view of a cylinder head of the engine; FIG. 2 and FIG. 3 are cross-sectional views (a cross-sectional view taken along the II—II line in FIG. 1 and a cross-sectional view taken along the III—III line in FIG. 1) of the cylinder head; FIG. 4 is a cross-sectional view showing an operation of a variable valve lift mechanism; FIG. 5 is a cross-sectional view (a cross sectional view taken along the V–V line in FIG. 1) of a portion where a fuel pump is mounted; FIG. 6 is a side view of the portion where the fuel pump is mounted; FIG. 7 and FIG. 8 are plane view and a side view of a bracket; FIG. 9 and FIG. 10 are cross-sectional views (a cross-sectional view taken along the IX–IX line and a cross-sectional view taken along the X–X line in FIG. 7) of the bracket; FIG. 11 is a cross-sectional view of a valve spring support portion; and FIG. 12 is a view of a rocker arm.

In the drawings, 1 denotes a water-cooled 4-cycle multi-cylinder engine, and the engine 1 includes: valve systems for driving intake and exhaust valves 4, 5 to open/close by intake and exhaust camshafts 6, 8, which will be described later, via rocker arms 7, 9; variable valve lift mechanisms for variably controlling lift amounts of the intake and exhaust valves 4, 5 according to a driving state of the engine; and a cylinder fuel injection device for injecting fuel directly into cylinders by fuel injectors 40.

A lower joint surface 3a of a head cover 3 is connected to an upper joint surface 2a of a cylinder head 2 of the engine 1, and a not-shown cylinder block is connected to a lower joint surface 2b thereof. A crankcase housing not-shown crankshafts is connected to this cylinder block. Note that 12 denotes holes for head bolts for fixing the cylinder head 2 to the cylinder block, and two head bolt holes are formed in each space between the cylinders.

Combustion recessed portions 2c are recessedly provided in the lower joint surface 2b of the cylinder head 2, and a space surrounded by the combustion recessed portion 2c, a cylinder bore of the cylinder block, and a top surface of a piston (not-shown) inserted in the cylinder bore is a combustion chamber.

Two intake openings 2d, 2d and two exhaust openings 2e, 2e are formed in each of the combustion recessed portion 2c, and the intake valves 4 and exhaust valves 5 are openably/closably disposed in the respective intake openings 2d and exhaust openings 2e. The intake valves 4 are driven to open/close by the intake camshaft 6 constituting the valve system via the intake rocker arms 7, and the exhaust valves 5 are driven to open/close by the exhaust camshaft 8 via the exhaust rocker arms 9. The intake and exhaust camshafts 6, 8 are driven to rotate by the crank shafts via timing chains (not shown).

Intake ports 2f communicating with the respective intake openings 2d are formed in the cylinder head 2 and the intake ports 2f join together in the middle to be led out to a right wall surface 2f' of the cylinder head 2. Further, exhaust ports 2g communicating with the respective exhaust openings 2e are formed in the cylinder head 2, and the exhaust ports 2g join together in the middle to be led out to a left wall surface 2g'. The intake ports 2f are formed to rise with each port axis f thereof making an angle of about 50 degrees relative to a cylinder axis A, while the exhaust ports 2g are formed to bend with each port axis g thereof making about a right angle relative to the cylinder axis A.

The variable valve lift mechanisms are provided for the intake and exhaust camshafts 6, 8. FIG. 4 shows the variable valve lift mechanism on an intake side, and since an exhaust side also has substantially the same structure, only the intake side will be described.

The variable valve lift mechanism includes: low-speed cam noses 6a and high-speed cam noses 6b which are formed in the intake camshaft 6; low-speed rocker arms 7a and high-speed rocker arms 7b which are independently turnable; catch pins 20 movable between the low-speed and high-speed rocker arms 7a, 7b; and a hydraulic cylinder portion 21 having pistons 21a, 21a that drive the reciprocating movement of the catch pins 20 so as to bring the high-speed rocker arms 7b into a lost motion state or a linked state to the low-speed rocker arms 7a. The hydraulic cylinder portion 21 is formed in a later-described cam carrier 11.

In a low-speed driving range, the rotation of the camshaft 6 is transmitted only to the low-speed rocker arms 7a and a lift amount of the intake valves 4 is small (see the right side of the cylinder axis A in FIG. 4). In a high-speed driving range, a hydraulic pressure supplied to an oil chamber 21b of the cylinder portion 21 causes the catch pins 20 to catch the high-speed rocker arms 7b and the rotation of the camshaft 6 is transmitted to the high-speed rocker arms 7b, so that a lift amount of the intake valves 4 is large (see the left side of the cylinder axis A in FIG. 4).

The cylinder fuel injection device includes the fuel injectors 40 for injecting fuel into the respective cylinders and a fuel pump 41 for supplying a high-pressure fuel to the fuel injectors 40. Each of the fuel injectors 40 is positioned vertically below a portion between the both intake ports 2f of the cylinder head 2 and is mounted slantwise so as to be substantially parallel with the port axis f of the intake ports 2f, and injection ports 40a of the fuel injectors 40 are directed toward center portions of the combustion chambers.

The cylinder head 2 is divided into a head main body 10 in which the intake and exhaust ports 2f, 2g are formed and the cam carrier 11 in which the intake and exhaust camshafts 6, 8 and the rocker arms 7, 9 are disposed, a lower surface 11f of the cam carrier 11 is placed on a support surface 10f of the head main body 10, and the cam carrier 11 together with cam caps 15, 16 is bolt-coupled to the head main body 10 by later-described cam bolts 43.

An outer peripheral wall 10a which extends to surround an outer peripheral portion of the cam carrier 11 is integrally formed with the head main body 10. The lower joint surface 3a of the head cover 3 is fixedly attached to the upper joint surface 2a of the outer peripheral wall 10a via an oil seal 13, thereby forming an oil-tight cam chamber 14.

In the cam carrier 11, integrally formed are: journal bearing portions 11a extending in a direction perpendicular to the camshafts to cross the cylinder axis A, one being provided for one cylinder; lateral wall portions 11c positioned between the cylinders to extend in the direction perpendicular to the camshafts; and longitudinal wall portions 11b extending in the direction of the camshafts, each coupling the adjacent journal bearing portion 11a and lateral wall portion 11c.

The intake-side and exhaust-side cam caps 15, 16 are fitted to an intake-side upper joint surface 11d and an exhaust-side upper joint surface 11e of each of the journal bearing portions 11a, respectively. Intake-side cam journal bearing holes 17 are formed between the intake-side upper joint surfaces 11d and lower joint surfaces 15a of the intake-side cam caps 15, and a journal portion of the intake camshaft 6 is rotatably supported by each of the cam journal bearing holes 17. Further, exhaust-side cam journal bearing holes 18 are formed between the exhaust-side upper joint surfaces 11e and lower joint surfaces 16a of the exhaust-side cam caps 16, and a journal portion of the exhaust camshaft 8 is rotatably supported by each of the cam journal bearing holes 18.

Plug holes 23 communicating with the combustion recessed portions 2c are formed in portions of the respective journal bearing portions 11a facing the cylinder axis A to pass through the head main body 10. Ignition plugs 24 are inserted in the plug holes 23, and the ignition plugs 24 are detachably attached to the head main body 10, with electrode portions thereof being positioned in the combustion recessed portions 2c. The plug holes 23 are formed such that each plug center line B is slightly deviated toward the exhaust side from the cylinder axis A.

Plug pipes 25 are inserted in the plug holes 23, and lower end portions 25a of the plug pipes 25 are fixedly press-fitted in plug holes 23a of the head main portion 10. Upper end portions 25b of the plug pipes 25 pass through pipe holes 3b formed in the head cover 3 to protrude outside, and spaces between the pipe holes 3b and the plug pipes 25 are oil-tightly sealed. Therefore, the inside of the plug pipes 25 and the cam chamber 14 are separated from each other, and it is possible to exchange the ignition plugs 24 without detaching the head cover 3. Further, ignition coils 26 connected to the terminal electrodes of the ignition plugs 24 are detachably attached to outer end portions of the plug pipes 25.

Recessed portions 10b are formed on both sides of the journal bearing portions 11a on the support surface 10f of the head main body 10. Intake-side and exhaust-side valve seat portions 10c, 10d are bulgingly formed in bottom portions of the recessed portions 10b, and valve guide holes 10g, 10g communicating with the intake and exhaust ports 2f, 2g are formed in the respective valve seat portions 10c, 10d. Valve shafts 4a, 5a of the respective intake and exhaust valves 4, 5 are slidably inserted in valve guide members 30 press-fitted in the respective valve guide holes 10g.

Valve portions 4b, 5b for opening/closing the intake and exhaust openings 2d, 2e are formed in lower ends of the respective valve stems 4a, 5a, and the rocker arms 7, 9 are in contact with upper ends thereof via valve chips 31, 31. Further, spring retainers 32, 33 are fixed to the upper end portions of the respective intake-side and exhaust-side valve stems 4a, 5a by taper fitting.

The valve spring support structure of this embodiment will be described.

Exhaust spring seats 10h are formed in peripheral edge portions of the valve guide holes 10g of the exhaust-side valve seat portions 10d. Exhaust valve springs 35 are disposed between the spring seats 10h and the exhaust-side spring retainers 33, and the exhaust valves 5 are biased in a closing direction by the valve springs 35.

Inner and outer intake spring seats 10j, 10k are formed in a peripheral edge portion of the valve guide hole 10g of each of the intake-side valve seat portions 10c. Inner springs 36 and outer springs 37 shorter in spring length than the inner springs 36 are coaxially arranged, the inner springs 36 being disposed between the inner spring seats 10j and inner positioning portions 32a of the intake-side spring retainers 32, and the outer springs 37 being disposed between the outer spring seats 10k and outer positioning portions 32b of the spring retainers 32, so that the springs 36, 37 both bias the intake valves 4 in the closing direction.

Here, each of the inner spring seats 10j is formed in a stepped-down shape so as to be positioned lower than the outer spring seat 10k. Accordingly, the spring length of the inner springs 36 is larger than the spring length of the outer springs 37, in other words, the outer springs 37 are made short while securing a necessary set load and the maximum load at the time of lifting. Further, since the inner and outer spring seats 10j, 10k are worked concurrently with a cutting tool conforming to the shape of the aforesaid step, man hours for the work do not increase.

According to the valve spring support structure of this embodiment, since the inner spring seat 10j of each of the intake-side valve seat portions 10c is formed in the stepped-down shape so as to be positioned lower than the outer spring seat 10k, the position of the intake-side spring retainers 32 is lowered, yet it is possible to secure the necessary spring length of the inner springs 36, and thus, the dimension of the cylinder head 2 in the cylinder axial direction can be reduced.

Further, in this embodiment, the outer spring seats 10k are formed at a high position, yet it is possible to secure the necessary set load and the maximum load, so that it is possible to inhibit increase in height dimension of the cylinder head 2 even when the fuel injectors 40 are disposed below the intake ports 2f of the cylinder head 2. Specifically, when the fuel injectors 40 are disposed below the intake ports 2f, the bulging portions for securing the arrangement spaces of the fuel injectors 40 tend to bulge toward inner surfaces of the intake ports, and in order to avoid this, the intake ports 2f need to be raised. This accordingly necessitates the spring seats of the intake valves 4 to be positioned high in order to secure necessary wall thickness of the ports, so that the position of the spring retainers 32 becomes high in order to secure the necessary spring length, resulting in the increase in height dimension of the cylinder head.

In this embodiment, since the spring length of the inner springs 36 can be made long, the length of the outer springs 37 is short and thus it is not necessary to raise the position of the spring retainers 32, so that it is possible to inhibit the increase in height dimension of the cylinder head 2.

Next, a rocker shaft arrangement structure will be described.

An intake-side and an exhaust-side rocker shaft 50, 51 extending in parallel with the camshafts 6, 8 are inserted in the cam carrier 11 to pass through the journal bearing portions 11a and the lateral wall portions 11c. The rocker shafts 50, 51 are unrotatably positioned and fixed by lock screws (fixing means) 52 screwed to the lateral wall portions 11 positioned between the cylinders of the cam carrier 11. The intake and exhaust rocker arms 7, 9 are turnably supported by the rocker shafts 50, 51.

The intake-side and exhaust-side rocker shafts 50, 51 are disposed on an inner side of the intake and exhaust valves 4, 5 respectively. Further, the intake-side and exhaust-side rocker shafts 50, 51 are symmetrically disposed with respect to the plug center line B that is deviated toward the exhaust side from the cylinder axis A, and as a result, the distance between the intake-side rocker shaft 50 and the cylinder axis A is shorter than the distance between the exhaust-side rocker shaft 51 and the cylinder axis A.

The intake-side and exhaust-side rocker shafts 50, 51, when viewed in a camshaft direction, are disposed to be deviated toward the plug axis B, with inner half portions thereof overlapping the plug pipes 25. Relief recessed portions 50a, 51a are recessedly provided in portions where the respective rocker shafts 50, 51 and the plug pipes 25 overlap each other. Each of the relief recessed portions 50a, 51a is formed by cutting so as to extend along an outer peripheral surface of the plug pipe 25 and to have an arc shape in a plane view.

In the device of this embodiment, the rocker arms and so on are assembled by the following procedure. The rocker shafts 50, 51 are inserted such that the rocker arms 7, 9 are positioned on both sides of the journal bearing portions 11a of the cam carrier 11 and collars 50b, 51b are positioned between the rocker arms 7, 9 and the lateral wall portions 11c, and the rocker shafts 50, 51 are rotated so that the relief recessed portions 50a, 51a face the cylinder center side and they are locked by the lock screws 52. Then, this assembled structure is placed on the support surface 10f of the head main body 10 such that the relief recessed portions 50a, 51a do not interfere with the plug pipes 25, the camshafts 6, 8 are set, and the cam caps 15, 16 are fitted and are fixedly fastened together by the cam bolts 43.

Since the cam carrier 11 is thus attachable/detachable to/from the head main body 11 and is mounted on the head main body 10 after the rocker shafts 50, 51 and the rocker arms 7, 9 are assembled outside, assembly operability can be improved.

Further, since the rocker shafts 50, 51 are fixed by the lock screws 52 at an angle position such that the relief recessed portions 50a, 51a coincide with the plug pipes 25, the work of mounting the cam carrier 11 on the head main body 10 can be performed easily.

According to this embodiment, since the intake-side and exhaust-side rocker shafts 50, 51, when viewed in the camshaft direction, are disposed with the respective inner half portions overlapping the plug pipes 25 and the relief recessed portions 50a, 51a are formed in the portions where the respective rocker shafts 50, 51 and the plug pipes 25 overlap each other, it is possible to dispose the rocker shafts 50, 51 to be closer to the cylinder axis A side by an amount of the respective relief recessed portions 50a, 51a, which can accordingly reduce a valve included angle. Consequently, it is possible to improve the shape of the combustion chambers and make the entire engine compact.

Since the rocker shafts 50, 51 can be brought close to the cylinder axis A side, it is possible to increase the raised angle of the intake ports 2f. Accordingly, when the fuel injectors 40 are disposed below the intake ports 2f of the cylinder head 2, there is no need to provide bulges of inner surfaces of intake paths for securing arrangement spaces of the injectors 40, thereby enabling a reduction in intake resistance.

The intake-side and exhaust-side rocker arms 7, 9 are formed of: base portions 7d, 9d having support holes 7c, 9c through which the rocker shafts 50, 51 are inserted; and arm portions 7e, 9e continuing from the base portions 7d, 9d to extend outward, and the valve chips 31 abut on lower surfaces of tips of the arm portions 7e, 9e. The tip portions of the respective arm portions 7e, 9e are formed such that the thickness thereof becomes larger toward a valve opening/closing direction, and pin holes 7g, 9g in which the aforesaid catch pins 20 are inserted are formed in the thick portions 7f, 9f.

Slipper surfaces 7h, 9h with which the cam noses of the respective camshafts 6, 8 are slidably in contact are formed on upper surfaces of the arm portions 7e, 9e. As shown in FIG. 12, each of the slipper surfaces 7h, 9h is in an arch shape with a radius R, and the base portions 7d, 9d and the arm portions 7e, 9e are positioned inside a circle r made by extending the slipper surfaces 7h, 9h. Each of the slipper surfaces 7h, 9h is formed by polishing work with a polishing cutting tool (not shown) that moves along the circle r while rotating.

According to this embodiment, since the slipper surfaces 7h, 9h of the intake-side and exhaust-side rocker arms 7, 9 are formed in the arc shape with the radius R and the base portions 7d, 9d and the arm portions 7e, 9e are positioned inside the circle r made by extending the slipper surfaces 7h, 9h, the polishing cutting tool can move along the circle r while rotating, so that it is possible to obtain desired surface roughness and work precision and to perform the polishing work in a short time, which can reduce work cost. Specifically, for example, if a base portion 9d' is positioned outside the circle r as shown by the chain double-dashed line in FIG. 12, the cutting tool moving along the circle r interfere with the base portion 9d'. Therefore, the polishing work is performed while the cutting tool is moved in a direction perpendicular to the drawing, which poses a problem of poor work precision and long work time.

Next, the mounting structure of the aforesaid fuel pump 41 will be described.

The fuel pump 41 includes: a pump main body 41a having a fuel intake port and a fuel discharge port which are not shown; a driving portion 41b having a plunger 41c; and a mounting flange portion 41d in a rhombic shape in a plane view that is integrally formed in a boundary portion between the driving portion 41b and the pump main body 41a, and when the plunger 41c is driven to reciprocate, the fuel is pressurized to be pressure-sent to the fuel injectors 40 via fuel supply pipes and fuel rails which are not shown.

The fuel pump 41 is disposed above the exhaust camshaft 8, between a both cylinders, and the plunger 41c is driven by three cam noses 8a that are formed in the exhaust camshaft 8 at 120-degree intervals.

The fuel pump 41 passes through a mounting hole 3d formed in a ceiling portion of the head cover 3 to be fixedly mounted on the cam carrier 11 of the cylinder head 2 via the bracket 42.

The bracket 42, which is made by aluminum die casting, includes: a main body portion 42b having an insertion hole 42a in which the driving portion 41b is inserted; and a base portion 42c in a rectangular shape in a plane view formed to be bridged between the adjacent cam caps 16, 16 of the exhaust camshaft 8, and bolt holes 42d are formed in respective corner portions of the base portion 42c. The base portion 42c together with the cam caps 16 is fixedly fastened to the cam carrier 11 by the cam bolts 43 inserted in the respective bolt holes 42d.

The main body portion 42b is in a substantially rhombic shape in a plane view, and it is composed of: a large-diameter portion 42e facing a peripheral edge portion of the mounting hole 3d in the lower surface of the head cover 3 with a small interval therebetween; and a small-diameter portion 42f protruding to the outside of the head cover 3 from the mounting hole 3d, and fixing bolts 44, 44 are implanted in both end portions of the small-diameter portion 42f. A relief recessed portion 42b' for avoiding contact with the camshaft 8 is recessedly disposed in a lower surface of the main body portion 42b.

A peripheral groove 42g is formed in an outer peripheral portion of the large-diameter portion 42e. A rubber seal member 45 is fitted in the peripheral groove 42g, and the rubber seal member 45 abuts on the peripheral edge portion of the mounting hole 3d. Consequently, a space between the mounting hole 3d and the bracket 42 is oil-tightly sealed.

The fuel pump 41 is fixed to the bracket 42 by the fixing bolts 44 and nuts 47 with a gasket 46 being interposed between the mounting flange portion 41d and the small-diameter portion 42f of the bracket 42. Further, the fuel pump 41 is set slantwise with the axis A1 thereof being inclined outward relative to the cylinder axis A (see FIG. 5). The gasket 46 is made of a resin member having metal thin plates on both surfaces thereof, thereby sealing the space between the fuel pump 41 and the bracket 42 oil-tightly.

According to the mounting structure of the fuel pump of this embodiment, since the fuel pump 41 is directly fixed to the cam carrier 11 of the cylinder head 2 via the bracket 42, it is possible to fix the fuel pump 41 to the cam carrier 11 having high strength and stiffness and to inhibit the occurrence of noises due to vibration of the fuel pump 41, compared with a conventional case where it is fixed to a head cover. Further, it is only necessary to add the bracket 42, which can inhibit cost increase.

In this embodiment, the fuel pump 41 is attached to the cam caps 16 of the cam carrier 11, which enables easy and reliable positioning of the fuel pump 41 and the camshaft 8.

In this embodiment, the bracket 42 is composed of: the main body portion 42b in which the driving portion 41b of the fuel pump 41 is inserted; and the base portion 42c, and the base portion 42c together with the adjacent cam caps 16, 16 is fixed to the cam carrier 11 by the cam bolts 43, so that it is possible to increase mounting strength of the fuel pump 41 and to easily and reliably position the fuel pump 41 relative to the camshaft 8. Moreover, the cam bolts 43 fastening the cam caps 16 to the cam carrier 11 are commonly used, which can inhibit increase in the number of parts.

In this embodiment, the main body portion 42b is composed of: the large-diameter portion 42e facing the peripheral edge portion of the mounting hole 3d of the head cover 3 with a small interval therebetween; and the small-diameter portion 42f protruding to the outside from the mounting hole 3d, and the rubber seal member 45 abutting on the peripheral edge portion of the mounting hole 3d is fitted to the large-diameter portion 42e, so that the rubber seal member 45 can prevent the vibration of the fuel pump 41 from transmitting to the head cover 3, which enables more reliable prevention of the occurrence of noises.

Further, since the small-diameter portion 42f protrudes to the outside from the head cover 3, it is possible to mount the fuel pump 41 after an engine unit is assembled, which can improve assemblability.

In this embodiment, the fuel pump 41 is set with the axis A1 thereof inclining outward relative to the cylinder axis A, so that an arrangement space for wiring of the ignition plugs 24, the fuel pipes to the fuel injectors 40, and so on can be secured above the head cover 3.

INDUSTRIAL AVAILABILITY

In a valve spring support structure according to the invention of claim 1, a spring seat of a cylinder head is composed of an outer spring seat and an inner spring seat that is formed in a stepped-down shape so as to be positioned lower than the outer spring seat, so that it is possible to make the spring length of the inner spring large and accordingly reduce the spring length of the outer spring while securing the necessary set load and the maximum load of lifting. Therefore, an outer spring seat is formed at a position enabling securing of a necessary wall thickness of a port, yet a spring retainer need not be positioned high, which accordingly can reduce the dimension of the cylinder head in the cylinder axial direction.

In the invention of claim 2, when a fuel injector is disposed substantially vertically below an intake port of the cylinder head, the intake port is raised toward the cylinder axis side, so that a bulging portion for securing the arrangement space of the fuel injector does not bulge toward an inner surface of the intake port, enabling improved engine performance with a reduced intake resistance. When the intake port is thus raised, there has been conventionally a concern about the increase in height dimension of the cylinder head, but in the present invention, since the inner spring can be made long as described above, the outer spring can be made short, so that it is not necessary to position a spring retainer high, which accordingly can inhibit the increase in height dimension of the cylinder head.

The invention claimed is:

1. A cylinder head for an internal combustion engine defining at least one valve supporting opening reciprocally supporting a valve stem a flow control valve, and a valve spring arrangement comprising inner and outer coaxially disposed coil springs for biasing said flow control valve in a closing direction, said coil springs being disposed between a spring seat formed in said cylinder head and a spring retainer fitted to an end portion of said valve stem, said spring seat being comprised of an outer spring seat and an inner spring seat of different heights relative to said valve supporting opening said inner spring having a greater length than said outer spring.

2. The cylinder head for an internal combustion engine according to claim 1, further including a fuel injector for injecting a fuel into a combustion chamber closed by said cylinder head disposed between the inlet opening of an intake port controlled by the valve and communicating with the combustion chamber and the surface of said cylinder head closing the combustion chamber.

3. The cylinder head as set forth in claim 2 wherein the intake port has a single inlet opening and a pair of outlet ports each serving the same combustion chamber and having its opening and closing controlled by a valve and valve spring arrangement as described.

4. The cylinder head as set forth in claim 3 wherein the fuel injector has a discharge port disposed in the combustion chamber between the pair of outlet ports and lies totally between the intake port and the surface of said cylinder head closing the combustion chamber.

* * * * *